Patented Jan. 8, 1952

2,581,389

UNITED STATES PATENT OFFICE 2,581,389

DRASTIC OXIDATION PRODUCTS OF UN-SATURATED FATTY ACID ESTERS OF OXY-ALKYLATED PHENOL-ALDEHYDE RESINS

Melvin De Groote, University City, and Bernhard Keiser, Webster Groves, Mo., assignors to Petrolite Corporation, Ltd., Wilmington, Del., a corporation of Delaware No Drawing. Application April 22, 1949, Serial No. 89,141

8 Claims. (Cl. 260—19)

The present invention is concerned with certain new chemical products, compounds or compositions which have useful application in various arts. This application is a continuation-in-part of our co-pending application Serial No. 751,614, filed May 31, 1947, and now abandoned. Attention is also directed to our co-pending application Serial No. 64,469, filed December 8, 1948, and also our application Serial No. 30,184, filed May 29, 1948.

This invention includes methods or procedures for manufacturing said new chemical products, compounds, or compositions, as well as the products, compounds, or compositions themselves. Said new compositions are drastically-oxidized esters in which the acyl radical is that of an unsaturated monocarboxy acid having at least 8 and not more than 22 carbon atoms, and the alcoholic radical is that of certain hydrophile polyhydric synthetic products; said hydrophile synthetic products being oxyalkylation products of: (A) An alpha-beta alkylene oxide having not more than four carbon atoms and selected from the class consisting of ethylene oxide, propylene oxide, butylene oxide, glycide, and methylglycide; and (B) an oxyalkylation-susceptible, fusible, organic solvent-soluble, water-insoluble, phenolaldehyde resin; said resin being derived by reaction between a difunctional monohydric phenol and an aldehyde having not over 8 carbon atoms and reactive toward said phenol; said resin being formed in the substantial absence of trifunctional phenols; said phenol being of the formula:

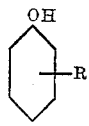

in which R is a hydrocarbon radical having at least 4 and not more than 12 carbon atoms and substituted in the 2,4,6 position; said oxyalkylated resin being characterized by the introduction into the resin molecule of a plurality of divalent radicals having the formula $(R_1O)_n$, in which $R_1$ is a member selected from the class consisting of ethylene radicals, propylene radicals, butylene radicals, hydroxypropylene radicals, and hydroxybutylene radicals, and $n$ is a numeral varying from 1 to 20; with the proviso that at least 2 moles of alkylene oxide be introduced for each phenolic nucleus; and with the final proviso that said drastic oxidation of the ester be by means of a gaseous oxygen-containing medium.

Although the herein described products have a number of industrial applications, they are of particular value for resolving petroleum emulsions of the water-in-oil type that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion. This specific application is described and claimed in our co-pending application Serial No. 89,140, filed April 22, 1949, now Patent 2,542,008, granted Feb. 20, 1951. See also our co-pending application Serial No. 64,468, filed December 8, 1948, and now abandoned.

The new products are useful as wetting, detergent and leveling agents in the laundry, textile and dyeing industries; as wetting agents and detergents in the acid washing of building stone and brick; as wetting agents and spreaders in the application of asphalt in road building and the like; as a flotation reagent in the flotation separation of various aqueous suspensions containing negatively charged particles, such as sewage, coal washing waste water, and various trade wastes and the like; as germicides, insecticides, emulsifying agents, as, for example, for cosmetics, spray oils, water-repellent textile finishes; as lubricants, etc.

The oxyalkylated resins, used to provide the alcoholic radical of the new esters, are described in our Patents 2,499,370, granted March 7, 1950, and 2,542,008, granted February 20, 1951, and reference is made to these patents for a description of phenol-aldehyde resins to produce the alcoholic products. For specific examples of the resins, reference is made to Examples 1a through 103a of Patent 2,499,370. For examples of oxyalkylated products derived from these resins, reference is made to the tables at columns 31 through 46 of Patent 2,542,008.

Having prepared or purchased suitable oxyalkylated derivatives to be used as alcoholic reactants, one can purchase or prepare various monocarboxy detergent-forming acids characterized by the fact that they have at least 8 and not more than 22 carbon atoms. The next step is to prepare the esters of such monocarboxy detergent-forming acids and the previously described oxyalkylated derivatives. The final step, after the preparation of the esters of the kind just described, is to subject them to drastic oxidation by means of a gaseous oxygen-containing medium, such as air, ozone, etc.

Reference is made to our co-pending application, Serial No. 64,454, filed December 8, 1948, now patent No. 2,541,995 issued February 20, 1951. Said co-pending application describes esters of the kind herein employed as intermediates, i. e., subjected to drastic oxidation. Said aforementioned application contemplates not only esters of unsaturated fatty acids, but also other esters, including saturated fatty acids. As previously stated, the monocarboxy detergent-forming acid esters herein contemplated are limited to those derived from unsaturated fatty acids having 8 to 18 carbon atoms, and particularly those which have 18 carbon atoms. Such unsaturated fatty acids include oleic acid, ricinoleic acid, linoleic acid, linolenic acid, undecylenic acid, etc. One may employ mixed fatty acids, as, for example, the fatty acids obtained from hydrolysis of cottonseed oil, soyabean oil, sunflower seed oil, dehydrated castor oil, etc.

As it is well known, in the production of an ester, one need not use the acid itself for the introduction of the acyl or acyloxy group. Any suitable functional equivalents such as the acyl halide, the acyl anhydride, the ester amide, etc., may be employed. Reference is also made to our co-pending application Serial No. 42,139, filed August 2, 1948, which is a continuation-in-part of our now abandoned applications, Serial Nos. 518,660, and 518,661, both filed January 17, 1944, insofar that they describe the production of esters of certain unsaturated fatty acids, and more particularly, drying oils involving alcoholic bodies which are essentially the same hydroxylated reactants, as herein described.

It will be noted that having obtained a compound which is essentially a polyhydric alcohol, i. e., an oxyalkylated resin of the type herein contemplated, one can produce esters by any one of the various procedures employed for producing esters of detergent-forming acids and the more common polyhydric alcohols. As is well known, one may well employ not only the fatty acid itself, but any suitable derivative, for instance, the acyl chloride, the anhydride, etc. In some instances, trans-esterification or cross-esterification can be employed. For instance, the oxyalkylated derivatives can be heated with the ethyl or methyl ester of the selected acid in presence of an alkaline catalyst so as to eliminate methyl or ethyl alcohol. Such procedure is particularly desirable when a hydroxylated acid is used, such as ricinoleic acid, etc. Trans-esterification or cross-esterification can be employed in connection with a glyceride with the formation of glycerine, which, under conditions of reaction, probably polymerize to give polyglycerols and thus gives a significant and many times a major proportion of the desired ester. It will be noted that part of what is said herein in regard to esterification and particularly in regard to the earlier examples, is comparable to what is said in our aforementioned co-pending application Serial No. 42,138, filed August 2, 1948, which, as previously stated, is a continuation-in-part of our now abandoned applications Serial Nos. 518,660 and 518,661, both filed January 17, 1944.

As a rather complete review of the preparation of polyhydric alcohol esters of fatty acids, see "Chemical Review 33" 257–349 (1943).

Example 1c

An oxyalkylated derivative, such as Example 121b of Patent 2,542,008, is esterified with soyabean oil fatty acids in an amount sufficient to convert approximately one-fourth of the polyglycol radicals into the fatty acid ester. The hydroxyl value of the oxyalkylated derivative can be calculated without determination, based on the hydroxyl value and weight of the phenol-aldehyde resin originally employed, plus the increase in weight after oxyalkylation. If glycide or methylglycide is employed, allowance must be made for the polyhydric character of the oxyalkylating reactant. In any event, if desired, the hydroxyl value of the oxyalkylated product can be determined by the Verley-Bolsing method, or any other acceptable procedure. The esterification reaction is conducted in any conventional manner, such as that employed for the preparation of the higher fatty acid esters of phenoxyethanol.

Fatty acids, and particularly unsaturated fatty acids, show at least some solubility in the oxyalkylated derivatives of the kind shown in the previous examples, even though this is not necessarily true of the glycerides of the fatty acids. In this instance, reference is made to the oxyalkylated derivatives in absence of a solvent. Since esterification is best conducted in a system, it is our preference to add xylene or even a higher boiling solvent, such as mesitylene, cymene, tetralin or the like, and conduct esterification in such consolute mixture. It is not necessary to add all the fatty acid at one time. One may add a quarter or half the total amount to be esterified, and after such portion of the reactant has combined, then add more of the fatty acid. The solubility of the fatty acid, of course, increases as the hydroxyl radical is replaced by an ester radical. This is also true if one resorts to trans-esterification or cross-esterification with the glyceride or low molal alcohol ester.

Our preference is to have present a substantial amount of xylene or higher boiling, water-insoluble solvent, and to distill under reflux condenser arrangement so that water resulting from esterification is volatilized and condensed along with the xylene vapor in a suitably arranged trap. The amount of xylene employed is approximately equal to one-half the weight of the mixed reactants. The water should be removed from the trap, either manually or automatically, and the xylene returned continuously for further distillation. Such reaction is hastened if a small amount of dry hydrochloric acid gas is continuously injected into the esterification mixture. When the reaction is completed, the xylene is removed by distillation. Small amounts of unreacted fatty acid can be converted into the methyl or ethyl ester and removed by vacuum distillation, or permitted to remain. For example, an excess of anhydrous ethyl alcohol can be added, and reacted so as to esterify any residual fatty acid, and then such excess of ethyl alcohol may be distilled off as 95% of alcohol-5% of water mixture; and thus, the water resulting from esterification with the alcohol can be removed. Although any residual fatty acid can be eliminated in the manner above described, this is of limited importance, except if one were preparing a drying oil fatty acid derivative which would ultimately find use in varnish production. In such instances elimination of all fatty acid is important to give enhanced alkali resistance.

However, even where the amount of fatty acid employed is stoichiometrically equal to the hydroxyl radicals present, we have not found it desirable to take any undue precaution to eliminate any residual fatty acid. As a matter of fact, numerous examples include the present one and those subsequently described which yield partial or fractional esters in which there is present residual hydroxyl radicals. Under such circumstances, there are substantially no free fatty acid radicals present; and the products obtained by partial esterification, instead of complete esterification, represent the most valuable type. A sulfonic acid, such as toluene sulfonic acid, may be added in amounts of one-half to 1% to act as a catalyst.

As a specific example, 900 grams of the xylene-containing resin of Example 121b of Patent 2,542,008 were reacted with 71 grams of soyabean fatty acid in the presence of 300 grams of additional xylene and 20 grams of para-toluene sulfonic acid. Reflux was continued for 3 hours, or until 4.5 grams of water had been evolved.

Example 2c

The same procedure was followed as in Example 1c, preceding, except that the amount of soyabean oil fatty acids employed was sufficient to convert one-half the polyglycol radicals into ester form.

As a specific example, 854 grams of the xylene-containing resin 116b of Patent 2,542,008 were reacted with 142.3 grams of soyabean fatty acids in the presence of 200 grams of additional xylene and 15 grams of para-toluene sulfonic acid at 140° C. until 9 grams of water had been evolved. This took about 4 hours.

Example 3c

The same procedure was followed as in Example 1c, preceding, except that the amount of soyabean oil fatty acids employed were sufficient to convert three-fourths of the polyglycol radicals into ester form.

As a specific example, 511 grams of the xylene-containing resin 125b of Patent 2,542,008 were reacted with 212.5 grams of soyabean fatty acid in the presence of 200 grams of additional xylene and 15 grams of para-toluene sulfonic acid at 145° C. to 147° C. for 3½ hours. 14.5 grams of water were evolved.

Example 4c

The same procedure was followed as in Example 1c, preceding, except that the amount of soyabean oil fatty acids employed was sufficient to convert substantially all of the polyglycol radicals into ester form.

As a specific example, 900 grams of the xylene-containing resin 121b of Patent 2,542,008 were reacted with 85.6 grams of methyl oleate in the presence of 200 grams of additional xylene and 2 grams of sodium methylate. After heating four hours at reflux (146° C.–148° C.) about 32 grams of ethyl alcohol had been recovered by aqueous extraction from the xylene in the D-S tray. The xylene was returned to the reaction vessel.

Example 5c

The same procedure was followed as in Examples 1c to 4c, preceding, except that the oxyalkated derivative, instead of being the kind exemplified under the heading of Example 121b of Patent 2,542,008, was a resin exemplified by either Example 106b or 132b of Patent 2,542,008.

Example 6c

The same procedure was followed as in Examples 1c to 4c, preceding, except that the oxyalkylated thermoplastic phenolaldehyde resin was one of the type exemplified by Examples 106b to 120b, of Patent 2,542,008, instead of one of the type exemplified by Examples 120b to 140b of Patent 2,542,008, inclusive.

Example 7c

The same procedure was followed as in Examples 1c to 6c, preceding, except that soyabean oil fatty acid was replaced by other unsaturated fatty acids, such as linoleic or linolenic or the mixed fatty acids obtained from peanut oil, sunflower seed oil, or the like. The diene fatty acids obtained from dehydrated castor oil may be employed.

Example 8c

The same procedure was followed as in Examples 1c to 6c, preceding, except that instead of employing soyabean oil fatty acid, a marine oil fatty acid such as the fatty acids obtained from hydrolysis of menhaden oil, is employed.

Example 9c

The same procedure was followed as in Examples 1c to 6c, preceding, except that instead of soyabean oil fatty acids, one employs instead a hydroxylated unsaturated fatty acid, such as ricinoleic acid, diricinoleic acid, or fatty acids obtained by treating a polyene fatty acid, such as linseed oil, with peroxide so as to convert part of the olefinic linkages into hydroxyl groups.

Example 10c

The same procedure was followed as in the preceding examples, except that the reaction was conducted by means of the ethyl or methyl ester instead of the fatty acid. The reaction was conducted preferably in the absence of any solvent, or if a solvent is employed, it should be fairly high boiling, such as xylene. Instead of using an acid catalyst, an alkali such as caustic soda or sodium methylate was employed. The amount used varies from one-tenth of 1% to 1%. An average value may be in the neighborhood of one-half of 1%. The reaction was conducted preferably with the methyl ester, which results in the elimination of methanol. In the presence of a solvent such as xylene, the methanol might distil over with the xylene, and if so, can be removed by washing with water, followed by removal of any moisture from the xylene, with subsequent return of xylene to the reaction vessel. However, any suitable procedure and any suitable catalyst may be employed so as to form the ester by elimination of a low molal alcohol, particularly methanol. The series of preceding examples, to wit, Examples 1c to 9c, inclusive, used various fatty acids. These should be replaced with a molecular equivalent of methyl oleate, methyl ricinoleate, methyl linoleate, etc.

Example 11c

The same procedure was followed as in the preceding examples, except that the ester was produced by cross-esterification or trans-esterification employing a glyceride so as to result in the formation of a non-volatile alcohol instead of a volatile alcohol as in Example 10c, preceding. The catalyst used was an alkaline catalyst and the temperature employed was approximately 200° to 225° C. The time of reaction may vary somewhat, but generally requires 3 to 8 hours. The temperature should be high enough to assure trans-esterification in presence of the alkaline catalyst, but in any event, should be below the point of pyrolysis, as far as the oxyalkylated derivative or fatty acid is concerned. As a rule, pyrolysis may take place at any temperature above 250° C. In the preceding Example 10c, the fatty acid was replaced by an equivalent molar proportion of the methyl or ethyl ester. In this instance it was replaced by an equivalent molar proportion of glyceride, and particularly the glyceride in the form of a naturally-occurring oil. Our preference is to use triolein, tristearine, triricinolein, linseed oil, castor oil, the glycerol ester obtained from the various fatty acids previously enumerated in Examples 1c to 11c, inclusive. Dehydrated castor oil may be employed.

In reactions of the kind with the liberation of a non-volatile alcohol, it is quite likely the reaction does not go to completion. However, the equilibrium apparently permits a significant or substantial yield, due, in part, to the fact that the glycerol forms polyglycerols with comparative ease, whereas, the hydroxyl radicals of the oxyalkylated derivatives may etherize to a lesser degree. There is also the possibility that in part the glycerol may etherize with the oxyalkylated derivative. This brings about the same result as if the oxyalkylated derivate had been treated with a mole of glycide as a terminal reactant.

We have prepared a large number of esters from a variety of unsaturated fatty acids and also from a variety of mixed fatty acids obtained by the hydrolysis of various fats or oils without an effort to separate such mixtures. We call particular attention to the fatty acids available from various sources, such as those prepared by Armour & Company and sold under the trade name of "Neo-fat" fatty acids. These are described completely in a booklet distributed by the Chemical Division of Armour & Company, Chicago, Illinois. We make particular reference to Neofat 3, Neofat 3R, Neofat S142, Neofat D142, Neofat 19, Neofat 23, DD Cottonseed Fatty Acids, DD Corn Oil Fatty Acids, DD Soyabean Fatty Acids, and DD Linseed Fatty Acids.

Some of the fatty acids which give particularly valuable products are enumerated in the following table: The first column indicates the example number; the second column indicates the specific oxyalkylated resin employed and previously described; the third column indicates the amount of resin solution employed, including the xylene present as a solvent; the fourth column indicates the amount of xylene present in the corresponding item in the previous column; the fifth column indicates the specific fatty acid, or mixed fatty acid, employed; the sixth column indicates the weight of fatty acid employed; the seventh column indicates the amount of para-toluene sulfonic acid used as a catalyst; the eighth column indicates the reflux temperature during ester formation; the ninth column indicates the amount of water which distilled over in the reflux trap; and the tenth column indicates the time of the reflux period after reaching temperature.

| Ex. No. | Resin Ex. No. of Patent 2,542,008 | Resin Sol. Used., Wt., Grams | Xylene in | Acid Used | Fatty Acid, Wt., Grams | P. T. S. A., Wt., Grams | Temp., °C. | Water off, Grams | Time, hrs. |
|---|---|---|---|---|---|---|---|---|---|
| 12c | 111b | 400 | 77.4 | Oleic | 93.4 | 20 | 145 | 10.7 | 6¾ |
| 13c | 122b | 300 | 71.3 | do | 71.5 | 20 | 145 | 6.1 | 2¼ |
| 14c | 133b | 300 | 44.7 | do | 62.5 | 20 | 142 | 2.6 | 5 |
| 15c | 136b | 300 | 50 | do | 103.2 | 15 | 148 | 9.2 | 5 |
| 16c | 106b | 300 | 61.6 | do | 190.2 | 20 | 151 | 9.0 | 5½ |
| 17c | 123b | 300 | 37.8 | do | 70.3 | 20 | 145 | 8.3 | 6½ |
| 18c | 117b | 300 | 54.6 | Linoleic | 79.0 | 20 | 152 | 9.0 | 8½ |
| 19c | 118b | 300 | 48.2 | Soya | 63.8 | 20 | 148 | 5.8 | 7¾ |
| 20c | 113b | 300 | 49.0 | do | 63.8 | 20 | 148 | 5.4 | 7½ |
| 21c | 121b | 300 | 71.5 | do | 101.9 | 20 | 149 | 3.1 | 5½ |
| 22c | 123b | 300 | 45.4 | do | 65.1 | 20 | 147 | 5.1 | 2¼ |
| 23c | 131b | 300 | 51.6 | do | 99.0 | 20 | 147 | 6.0 | 3¼ |
| 24c | 137b | 300 | 50.0 | do | 68.8 | 15 | 146 | 5.8 | 4¼ |
| 25c | 117b | 300 | 54.6 | Ricinoleic | 83.5 | 20 | 144 | 6.6 | 6½ |
| 26c | 112b | 300 | 62.5 | do | 79.1 | 20 | 147 | 8.3 | 6¾ |
| 27c | 132b | 300 | 53.5 | do | 78.2 | 10 | 148 | 2.0 | 2½ |
| 28c | 137b | 300 | 50 | do | 82.3 | 15 | 148 | 3.9 | 4¼ |
| 29c | 121b | 300 | 71.5 | do | 100.0 | 20 | 146 | 4.6 | 5 |

One rather peculiar property is the fact that where some of the oxyalkylated resins show moderate or limited solubility in water prior to esterification, particularly in the manner last indicated, they sometimes seem to show even greater solubility in water after such esterification process, notwithstanding the fact that apparently a large hydrophobe radical is introduced, and in essence, the repetitious alkylene oxide linkage apparently must solubilize both hydrophobe radicals, i. e., the one derived from the resin and the one derived from the unsaturated higher fatty acid.

It has been pointed out previously that the oxyalkylated resins vary from semi-solids or solids, or sticky solids, to liquids, showing little or no viscosity, or, in any event, viscosity no greater than that of castor oil. Needless to say, if a solvent such as xylene is present, the viscosity is reduced and the solution of a solid may become a liquid. The water-soluble or dispersible characteristics of the oxyalkylated resins have been described previously in detail; also their surface-activity or sub-surface-activity. The color of these oxyalkylated resins varies from almost colorless to deep amber, dark brown, or black, or reddish-black. The esters produced show the same variation, except, as a rule, the color becomes darker, particularly when para-toluene sulfonic acid is used as a catalyst, and particularly if the air is not excluded during esterification. The solubility in water, or dispersibility, is almost invariably reduced by the introduction of a sizable hydrophobe group. In some instances, this reduction in water solubility or water dispersibility does not seem to take place. As the materials become esterified, there is a tendency to reduce the viscosity, as far as going from solids to semi-solids or liquids go, or as far as tackiness goes. In some instances where the oxyalkylated derivatives are liquids prior to esterification, there seems to be no change in viscosity, or, at least, a modest increase. Experience has indicated that practically all, or many, of these products can be bleached with clays, charcoal or the like, to produce products which are much lighter in color, and, if desired, the solvent present, i. e., xylene, can be removed by distillation, and particularly vacuum distillation. For purposes of preparing derivatives to be used in demulsification, these steps are unnecessary and the products prepared as described are very effective. This is also true of application in other arts.

Having obtained unsaturated fatty acid esters of the kind described, they are subjected to drastic oxidation in much the same way that is employed in producing blown castor oil, blown soyabean oil, blown neat's-foot oil, etc. It is well known that oxidized oils can be obtained from castor oil, ricinoleic acid, and various derivatives of ricinoleic acid, such as monoricinolein, diricinolein, and polyricinoleic acid. They are produced by the common practice of blowing or oxidizing castor oil and similar fatty oils or acids, particularly non-drying unsaturated fatty oils, by means of a gaseous medium, such as air, oxygen, ozone, or ozonized air. The gaseous medium, such as air, may be moist or dry and the oxidation may take place in the presence or absence of a catalyst. The catalyst may be of a metallic type, such as lead ricinoleate, cobalt ricinoleate, manganese ricinoleate, etc., or it may be of the organic type which produces peroxide such as alpha-pinene, linseed oil, etc. Oxidation may take place at atmospheric pressure or superatmospheric pressure, i. e., pressures up to or including 200 pounds gauge pressure, and at any temperature slightly above the boiling point of water, for instance, 120° C., up to any temperature which does not produce undue decomposition by pyrolytic reaction.

The time of blowing may be fairly brief, for example, 8–10 hours; or it may be quite extentive, for instance, as long as 10–12–14 days, the longer time periods being employed generally when the temperature is just slightly above the boiling point of water, and when oxidation is with air at atmospheric pressure.

One method of preparing drastically-oxidized castor oil is described in U. S. Patent No. 2,023,-979, dated December 10, 1935, to Stehr. Also, see U. S. Patent No. 2,183,487, dated December 12, 1949, to Colbeth.

In our previously mentioned co-pending application Serial No. 30,183, filed May 29, 1948 now Patent 2,498,656 issued February 28, 1950, we described the oxidation of the hydrophile hydroxylated oxyalkylated resins identified by numerals followed by the letter "b," of which there have been a large number of examples. In that particular application we were concerned with the same sort of drastic oxidation step as herein employed, but with the oxidation of the polyhydric alcohol, as distinguished from the partial or complete ester. There is every indication that, in addition to the oxidation of the fatty material which introduces complexities of the kind which are present in the oxidation of castor oil, there is also oxidation of the kind described in our co-pending application Serial No. 30,183, filed May 29, 1948. For this reason, and in order to shed greater light on this series of complicated changes which take place, the following is quoted verbatim:

"This example (i. e., an oxidized unesterified oxyalkylated resin, particularly 1b) clearly illustrates the products obtained by drastic oxidation of the oxyalkylated thermoplastic phenol-aldehyde resins employing a gaseous oxygen-containing medium. The changes that take place are so marked that there is no question as to the nature of the product which has been subjected to oxidation. In the first place, there is an enormous increase in viscosity; in fact, if drastic oxidation is continued, the entire mass becomes stringy, sub-rubbery, or rubbery, and insoluble in any one of numerous solvents, such as xylene, diethylether of ethylene glycol, or diethylether of diethylene glycol, or mixtures of aromatic solvents and alcohols, such as butyl alcohol.

"However, as soon as there is any marked change in viscosity there is also a marked change in water-solubility, or in the hydrophile property of the compound. In other words, if one starts with an oxyalkylated resin which shows self-emulsifiability prior to drastic oxidation, this property will be reduced greatly or will almost disappear short of the sub-rubbery stage. If one employs an oxyalkylated resin which shows complete water-solubility, then after drastic oxidation, this property will be largely lost or almost completely disappear. Such drastically-oxidized product still has some hydrophile characteristics, due to the obvious presence of oxygen atoms. Thus, the characteristic properties of the oxidized products are (1) reduced hydrophile property, (2) increased viscosity, and (3) indications that further oxidation may readily convert the product to a stringy or sub-rubbery stage. It may seem that the properties previously noted could be related to ester formation. In other words, one could assume that oxidation converts some of the hydroxyl radicals to carboxyl radicals, and these, in turn, esterify with some of the remaining hydroxyl radicals to produce esters. Such cross-linking would, of course, account for properties of the kind previously described, if such esterification did take place. However, chemical examination of the drastically-oxidized product indicates little or no increase in either the acid number, or in the saponification number, at least insufficient to account for the change. Thus, as one would expect, saponification does not regenerate the corresponding parent type of material. It is possible that the change which takes place involves formation of ether linkages between alkylene radicals or residues."

In light of what has been said previously, it hardly appears necessary to include any examples of the final drastically-oxidized ester. However, as a matter of convenience, the invention may be illustrated by the following examples:

*Example 1d*

A thermoplastic resin is prepared from amyl or butyl phenol and formaldehyde in the manner previously described and illustrated by preceding examples. Such resin is then divided into three parts and one portion treated with ethylene oxide equal to 1½ times the weight of the resin. The second portion is treated with ethylene oxide equal to three times the weight of the resin. The third portion is treated with ethylene oxide equal to 4½ times the weight of the resin. Each of these three portions is reacted with the ethyl or methyl ester of ricinoleic acid in presence of an alkaline catalyst, so as to eliminate the low molal alcohol and form the ricinoleic acid ester. Our preference is to use the stoichiometric amount so as to convert all the hydroxyl radicals into ester radicals. Each of the three esters thus obtained is subjected to low temperature oxidation by means of air until the drastically-oxidized product is just short of reaching a rubbery or insoluble state. Our preference is to use a temperature varying from between 95° C. and 110° C., and to oxidize for about 5 to 10 days. The initial products, prior to oxidation, have a to medium amber appearance, and the final products have a definitely dark amber appearance and are much more viscous than the initial products.

*Example 2d*

The same procedure is followed as in the preceding example, except that the methyl or ethyl esters of soyabean fatty acid are employed so as to introduce fatty acids of the kind which occur naturally in soyabean oil.

*Example 3d*

The same procedure is followed as in Example 1d, preceding, except that the methyl or ethyl ester of undecylenic acid is employed. Our experience has been that generally the period of oxidation must be extended approximately 25%, for the reason that these esters do not oxidize quite as rapidly as a rule.

*Example 4d*

The same procedure is followed as in Example 1d, preceding, except that the methyl or ethyl esters of rapeseed oil fatty acids are employed.

*Example 5d*

The same procedure is followed as in Example 1d, preceding, except that the esters derived from menhaden oil after partial hydroxylation by means of hydrogen peroxide, are employed.

*Example 6d*

The same procedure is followed as in Example 1d, preceding, except that the methyl or ethyl esters derived from dehydrated castor oil, are employed.

*Example 7d*

The same procedure is followed as in the six previous examples, except that a stoichiometric equivalent of propylene oxide is employed instead of ethylene oxide.

It may seem, at first casual examination, that the same products could be obtained by esterifying the fatty acids of properly selected blown oils with the oxyalkylated resins. Such is not the case apparently for two reasons. In the first place, converting blown glycerides of any kind, for instance, blown castor oil or blown dehydrated castor oil, into the corresponding methyl or ethyl ester, produces certain changes in structure, for the reason that such drastically-oxidized products contain hydroxy acid esters thereof, anhydrides, and other compounds which are susceptible to change during saponification or esterification. In the second place, the mere oxidation of oxyalkylated thermoplastic phenol-aldehyde resins herein described, produces certain changes which are not understood, but which clearly affect the properties of such material, all of which is described in our co-pending application Serial No. 30,183, filed May 29, 1948.

Referring to the large series of examples which have been produced and described, preceding, we have preferred to do as follows in the oxidation stage. In the first place, after esterification, we have made it a point to remove all the xylene either permitting the xylene to be caught in the trap and removed, or else making the usual connection with the condenser so as to remove the xylene or use a vacuum pump and a temperature up to 130° or 135° C. If desired, of course, the xylene can be left in the mass, for the reason that as gaseous oxidation starts, the xylene is gradually removed by mere passage of air or the like. This, however, means an unnecessary loss of xylene, particularly on a large scale. Secondly, we prefer to neutralize any sulfonic acid present as a catalyst, adding just the required amount of the concentrated 25% caustic solution. In the following experiments which are tabulated below, the particular esters employed are those which have been described previously. In each case we employed approximately 1,000 grams of the ester and a temperature approximately 110° to 115° C. A continuous stream of air was passed through the mixture and the material oxidized until there was a drastic change, as previously noted, i. e., a darkening of the product along with a marked change in viscosity. In most cases attempt was made to blow the products until they were as thick as possible without being livery or suggestive that they would shortly enter the gelation or semi-rubbery stage. The oxidation invariably darkened the materials, increased their viscosity, and, in fact, made them much more viscous and invariably darkened the products, and frequently they had a tacky or almost incipient tacky nature.

In such case, however, the state of oxidation was stopped at such a point that the final product was still soluble in a solvent, particularly xylene or the like. Furthermore, in all these particular experiments listed in the table, and for that matter, the others described previously, the final products met the same qualification test for presence of hydrophile properties previously noted in connection with the oxyalkylated resins themselves, i. e., the xylene solution, when shaken with water, produced an emulsification as previously described.

In the following table the first column indicates the example number; the second column indicates the particular ester previously described; the third column the amount of ester oxidized, which was generally 1,000 grams; the fourth column indicates the temperature of oxidation which was generally in the neighborhood of 110° C.; the fifth column indicates oxidizing agent used, which was air, without any attempt to dry the air; the sixth column shows the air stream rate. In the oxidation of a 1,000 gram sample we have used a flask of approximately 3 liter capacity so as to allow room for a foam build-up without a carry-over where this occurred. Also, it is quite possible that as foam build-up starts, oxidation takes place in the foam to a considerable degree, rather than in the mere passage of the air bubble through the liquid phase. We have considered a slow rate as being one where we attempted to permit a bubble to reach the top of the fluid before the next bubble appeared. We have considered a fast rate as one in which a multiplicity of bubbles are passed through as rapidly as possible without forcing the foam out of the oxidation flask. We have considered a medium rate as one somewhere in between, i. e., a multiplicity of bubbles passing through the liquid layer at all times, but not in a stream sufficient to force foam out of the flask. This particular value is not critical.

The seventh column indicates the time of oxidation and generally lasts from 100 hours to about 150 hours, or approximately five, six, or seven days. The time is indicated in days.

The eighth column indicates the final appearance of the product which was generally dark and highly viscous.

The ninth column indicates whether or not the product is soluble in xylene, or, in some instances, more soluble in the diethylester of ethylene glycol, or the diethylester of diethylene glycol. The word "yes" simply means that the sample did meet the solubility requirements.

| Ex. No. | Ex. No. of Ester | Grams | Temp. of Ox-n., °C. | Ox. Agt. Used | Air Stream Rate | Time, days | Appear. Final Prod. | Solubility, Final Prod. |
|---|---|---|---|---|---|---|---|---|
| 8d | 12c | 1,000 | 110 | Air | Medium | 6 | Dark increased viscosity | Yes. |
| 9d | 13c | 1,000 | 111 | ...do... | ...do... | 5½ | ...do... | Do. |
| 10d | 16c | 1,000 | 109 | ...do... | ...do... | 7 | ...do... | Do. |
| 11d | 18c | 1,000 | 111 | ...do... | ...do... | 4¾ | ...do... | Do. |
| 12d | 19c | 1,000 | 108 | ...do... | ...do... | 6 | ...do... | Do. |
| 13d | 20c | 1,000 | 112 | ...do... | ...do... | 6 | ...do... | Do. |
| 14d | 21c | 1,000 | 111 | ...do... | ...do... | 6½ | ...do... | Do. |
| 15d | 22c | 1,000 | 109 | ...do... | ...do... | 6 | ...do... | Do. |
| 16d | 25c | 1,000 | 112 | ...do... | ...do... | 5¼ | ...do... | Do. |
| 17d | 26c | 1,000 | 108 | ...do... | ...do... | 6¾ | ...do... | Do. |
| 18d | 29c | 1,000 | 110 | ...do... | ...do... | 7½ | ...do... | Do. |

In some few instances where oxidation does not seem to take place as rapidly as it should, we have found that all that was required was to add about 1/10 of 1% of a catalyst previously referred to, such as manganese naphthenate, cobalt naphthenate, etc. Sometimes a little less is more than enough, and other times the amount of catalyst can be increased moderately, for instance, twice as much.

Having thus described our invention, what we claim as new and desire to secure by Letters Patent is:

1. A blown ester in which the acyl radical is that of an unsaturated fatty acid having at least 8 and not more than 22 carbon atoms, and the alcoholic radical is that of certain hydrophile polyhydric synthetic products; said hydrophile synthetic products being oxyalkylation products of (A) an alpha-beta alkylene oxide having not more than 4 carbon atoms and selected from the class consisting of ethylene oxide, propylene oxide, butylene oxide, glycide, and methylglycide; and (B) an oxyalkylation-susceptible, fusible, organic solvent-soluble, water-insoluble, phenol-aldehyde resin; said resin being derived by reaction between a difunctional monohydric phenol and an aldehyde having not over 8 carbon atoms and having one functional group reactive toward said phenol; said resin being formed in the substantial absence of phenols of functionality greater than 2; said phenol being of the formula

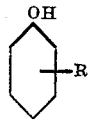

in which R is a hydrocarbon radical having at least 4 and not more than 12 carbon atoms and substituted in one of the positions ortho and para; said oxyalkylated resin being characterized by the introduction into the resin molecule at the phenolic hydroxyls of a plurality of divalent radicals having the formula $(R_1O)_n$, in which $R_1$ is a member selected from the class consisting of ethylene radicals, propylene radicals, butylene radicals, hydroxypropylene radicals, and hydroxybutylene radicals, and $n$ is a numeral varying from 1 to 20; with the proviso that at least 2 moles of alkylene oxide be introduced for each phenolic nucleus, and with the final proviso that the blowing of the ester be by means of a gaseous oxygen-containing medium.

2. A blown ricinoleate of certain hydrophile polyhydric synthetic products; said hydrophile synthetic products being oxyalkylation products of (A) an alpha-beta alkylene oxide having not more than 4 carbon atoms and selected from the class consisting of ethylene oxide, propylene oxide, butylene oxide, glycide and methylglycide; and (B) an oxyalkylation-susceptible, fusible, organic solvent-soluble, water-insoluble phenol-aldehyde resin; said resin being derived by reaction between a difunctional monohydric phenol and an aldehyde having not over 8 carbon atoms and having one functional group reactive toward said phenol; said resin being formed in the substantial absence of phenols of functionality greater than 2; said phenol being of the formula:

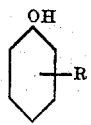

in which R is a hydrocarbon radical having at least 4 and not more than 12 carbon atoms and substituted in one of the positions ortho and para; said oxyalkylated resin being characterized by the introduction into the resin molecule at the phenolic hydroxyls of a plurality of divalent radicals having the formula $(R_1O)_n$, in which $R_1$ is a member selected from the class consisting of ethylene radicals, propylene radicals, butylene radicals, hydroxypropylene radicals, and hydroxybutylene radicals, and $n$ is a numeral varying from 1 to 20; with the proviso that at least 2 moles of alkylene oxide be introduced for each phenolic nucleus; with the further proviso that the hydrophile properties of the ester as well as the oxyalkylated resin in an equal weight of xylene are sufficient to produce an emulsion when said xylene solution is shaken vigorously with one to three volumes of water; and with the final proviso that said blowing of the ester be by means of a gaseous oxygen-containing medium.

3. A blown ricinoleate of certain hydrophile polyhydric synthetic products; said hydrophile synthetic products being oxyethylation products of (A) ethylene oxide; and (B) an oxyethylation-susceptible, fusible, organic solvent-soluble, water-insoluble phenol-aldehyde resin; said resin being derived by reaction between a difunctional monohydric phenol and an aldehyde having not over 8 carbon atoms and having one functional group reactive toward said phenol; said resin being formed in the substantial absence of phenols of functionality greater than 2; said phenol being of the formula:

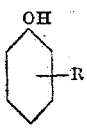

in which R is a hydrocarbon radical having at least 4 and not more than 12 carbon atoms and substituted in one of the positions ortho and para; said oxyethylated resin being characterized by the introduction into the resin molecule at the phenolic hydroxyls of a plurality of divalent radicals having the formula $(C_2H_4O)_n$; wherein $n$ is a numeral varying from 1 to 20; with the proviso that at least 2 moles of ethylene oxide be introduced for each phenolic nucleus; with the further proviso that the hydrophile properties of the ester as well as the oxyethylated resin in an equal weight of xylene are sufficient to produce an emulsion when said xylene solution is shaken vigorously with one to three volumes of water; and with the final proviso that said blowing of the ester be by means of a gaseous oxygen-containing medium.

4. A blown ricinoleate of certain hydrophile polyhydric synthetic products; said hydrophile synthetic products being oxyethylation products of (A) ethylene oxide; and (B) an oxyethylation-susceptible, fusible, organic solvent-soluble, water-insoluble, low-stage phenol-aldehyde resin having an average molecular weight corresponding to at least 3 and not over 7 phenolic nuclei per resin molecule; said resin being derived by reaction between a difunctional monohydric phenol and formaldehyde; said resin being formed in the substantial absence of phenols of functionality greater than 2; said phenol being of the formula:

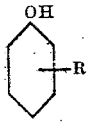

in which R is an aliphatic hydrocarbon radical having at least 4 and not more than 12 carbon atoms and substituted in one of the positions ortho and para; said oxyethylated resin being characterized by the introduction into the resin molecule at the phenolic hydroxyls of a plurality of divalent radicals having the formula $$(C_2H_4O)_n$$

wherein $n$ is a numeral varying from 1 to 20; with the proviso that at least 2 moles of ethylene oxide be introduced for each phenolic nucleus; with the further proviso that the hydrophile properties of the ester as well as the oxyethylated resin in an equal weight of xylene are sufficient to produce an emulsion when said xylene solution is shaken vigorously with one to three volumes of water; and with the final proviso that said blowing of the ester be by means of a gaseous oxygen-containing medium.

5. The product of claim 4, wherein R is substituted in the para position.

6. The product of claim 4, wherein R is a butyl radical substituted in the para position.

7. The product of claim 4, wherein R is an amyl radical substituted in the para position.

8. The product of claim 4, wherein R is a nonyl radical substituted in the para position.

MELVIN DE GROOTE.
BERNHARD KEISER.

REFERENCES CITED

The following references are of record in the file of this patent:

UNITED STATES PATENTS

| Number | Name | Date |
|---|---|---|
| 2,169,991 | Rosenblum | Aug. 15, 1939 |
| 2,268,947 | Krumbhaar | Jan. 6, 1942 |
| 2,499,365 | De Groote | Mar. 7, 1950 |